(12) United States Patent
Johnson

(10) Patent No.: US 11,847,548 B2
(45) Date of Patent: Dec. 19, 2023

(54) UNIVERSAL PASSENGER SEAT SYSTEM AND DATA INTERFACE

(71) Applicant: Rockwell Collins, Inc., Cedar Rapids, IA (US)

(72) Inventor: Glenn A. Johnson, Rural Hall, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1448 days.

(21) Appl. No.: 15/903,153

(22) Filed: Feb. 23, 2018

(65) Prior Publication Data

US 2019/0266472 A1   Aug. 29, 2019

(51) Int. Cl.
*G06N 3/04*   (2023.01)
*B60N 2/00*   (2006.01)
(Continued)

(52) U.S. Cl.
CPC ............... *G06N 3/04* (2013.01); *B60N 2/002* (2013.01); *B60N 2/242* (2013.01); *B64D 11/06* (2013.01);
(Continued)

(58) Field of Classification Search
CPC .......... G06N 3/04; B60N 2/002; B60N 2/242; B60N 2/04; B60N 2/22; B60N 2/90;
(Continued)

(56) References Cited

U.S. PATENT DOCUMENTS 6,490,515 B1   12/2002   Okamura et al.
10,713,859 B1 *   7/2020   McZeal, Jr. ............. G01S 19/17
(Continued)

FOREIGN PATENT DOCUMENTS

| DE | 60311423 T2 | 10/2007 |
|---|---|---|
| JP | 2002067757 A | 3/2002 |
| WO | 2005030523 A1 | 4/2005 |

OTHER PUBLICATIONS

CN 107531236 A, Chan et al., "Based on Control of The Vehicle Passenger" (Year: 2018).*

(Continued)

*Primary Examiner* — Kim T Nguyen
(74) *Attorney, Agent, or Firm* — Suiter Swantz pc llo

(57) ABSTRACT

A universal passenger seat system includes a system controller and a physical connection interface with a standardized communication protocol for coupling the system controller with seating hardware, at least one peripheral device, and at least one network connection. The system controller can also be in communication with a biometric sensor, a physiological sensor, and/or a situational data sensor. An artificial intelligence engine is communicatively coupled to or embedded within the system controller. The artificial intelligence engine is configured to determine a passenger status based on data received from the biometric sensor, the physiological sensor, and/or the situational data sensor and is further configured to generate one or more communication signals based on the data. For example, the communication signals can include control signals for the seating hardware, information signals for peripheral devices, or status signals for transmission via the network connection.

12 Claims, 11 Drawing Sheets

(51) Int. Cl.
*B60N 2/24* (2006.01)
*H04L 67/12* (2022.01)
*H04W 4/40* (2018.01)
*H04W 4/38* (2018.01)
*H04W 4/02* (2018.01)
*B64D 25/04* (2006.01)
*B64D 11/06* (2006.01)
*H04W 4/90* (2018.01)
*H04W 4/42* (2018.01)

(52) U.S. Cl.
CPC .............. *B64D 25/04* (2013.01); *H04L 67/12* (2013.01); *H04W 4/02* (2013.01); *H04W 4/38* (2018.02); *H04W 4/40* (2018.02); *H04W 4/42* (2018.02); *H04W 4/90* (2018.02)

(58) Field of Classification Search
CPC .... B64D 11/06; B64D 25/04; B64D 11/0641; H04L 67/12; H04W 4/02; H04W 4/38; H04W 4/40; H04W 4/42; H04W 4/90; B61D 33/0007; B63B 29/04; B63B 2029/043; G08C 17/02; G08C 19/00
See application file for complete search history.

(56) References Cited

U.S. PATENT DOCUMENTS

| | | | |
|---|---|---|---|
| 2005/0080533 A1* | 4/2005 | Basir ................. | B60R 21/01516 |
| | | | 701/45 |
| 2011/0068935 A1 | 3/2011 | Riley et al. | |
| 2013/0249262 A1 | 9/2013 | Herman et al. | |
| 2016/0378112 A1* | 12/2016 | Ljubuncic ............. | B60W 30/16 |
| | | | 701/45 |
| 2017/0105540 A1 | 4/2017 | Jacobs et al. | |
| 2017/0283086 A1 | 10/2017 | Garing et al. | |
| 2018/0099630 A1* | 4/2018 | Todasco ............... | B60N 2/0244 |

OTHER PUBLICATIONS

Examination Report for European Application No. 19158827.6 dated Jun. 19, 2020, 6 pages.
Extended European Search Report dated Jul. 16, 2019 for European Application No. 19158827.6.

* cited by examiner

200 UNIVERSAL PASSENGER SEAT SYSTEM

- 202 SYSTEM CONTROLLER
- 204 BUILT IN TEST EQUIPMENT
- 206 DYNAMIC ROUTER
- 208 COMMUNICATION PROTOCOLS
- 210 DATA STREAM PROCESSING SYSTEM
- 212 LOCATION DETERMINING COMPONENT
- 214 GLOBAL AERONAUTICAL DISTRESS & SAFETY SYSTEM
- 216 ARTIFICIAL INTELLIGENCE ENGINE
- 218 ACTUATION CONTROL HARDWARE
- 220 PHYSICAL CONNECTION INTERFACE
- 222 NEURAL NETWORK PROCESSOR
- 224 CLOUD TENSOR PROCESSING UNIT
- 226 BIOMETRIC SENSOR
- 228 PHYSIOLOGICAL SENSOR
- 230 HUMAN MACHINE INTERFACE
- 232 SITUATIONAL DATA SENSORS

FIG.2

UNIVERSAL PASSENGER SEAT SYSTEM AND DATA INTERFACE

BACKGROUND

The advent of autonomous vehicles and increased reliance on mass transit vehicles (e.g., busses, trains, airplanes, boats, etc.) create a scenario where most passengers will be recumbent and none drivers. Most vehicles will then have passengers that share the fact that they are non-participants.

With travel times happening above one to two hours, passengers will need to recline, to stretch out and to go into "bed mode." In the past few years train manufacturers have reengineered articulating aircraft business class seats to fit in premium spaces on high speed trains. They have seen the aircraft industry lead the way in this mode of travel. Additionally, the technology and information streamed through the various autonomous and/or mass transit vehicles will be pumped into passenger cabins. In the case of modern automobiles the communication technology and actuation is also ported into the seat unit.

There is a need to have a singular system that copes with the seating demands of each transportation method as one combined modular system. This development would the engineering effort and resources spent. In other areas, there have been similar cross over adoptions. For example, physical seat track fittings from one industry to another and electrical control buses going the other way. In other words the industries are already borrowing good ideas from each other in an ad hoc fashion.

With an increased use of autonomous and/or mass transit vehicles, there is also an increased need to verify what is happening to the passenger, what is happening in the particular travel segment and specifically what is happening when an incident occurs.

SUMMARY

In one aspect, embodiments of the inventive concepts disclosed herein are directed to a universal passenger seat system (UPSS). The UPSS can include an enclosure configured to be coupled to a seat support structure with a system controller disposed within the enclosure. The UPSS can further include a physical connection interface with a standardized communication protocol for coupling the system controller with seating hardware, at least one peripheral device, and at least one network connection. The system controller can also be in communication with a biometric sensor, a physiological sensor, and/or a situational data sensor. An artificial intelligence engine is communicatively coupled to or embedded within the system controller. The artificial intelligence engine is configured to determine a passenger status based on data received from the biometric sensor, the physiological sensor, and/or the situational data sensor and is further configured to generate one or more communication signals based on the data. For example, the communication signals can include control signals for the seating hardware (e.g., to adjust seat position, temperature, etc.), information signals for peripheral devices (e.g., mobile devices, media interfaces, health monitoring systems, and the like), or status signals for transmission via the network connection (e.g., for communication with an onboard or remote passenger information system).

In a further aspect, embodiments of the inventive concepts disclosed herein are directed to a passenger seat. The passenger seat can include a lower body support member, an upper body support member, and a seat support structure coupled to the lower body support member and/or the upper body support member. The passenger seat can include or be coupled to the universal passenger seat system. For example, the enclosure of the universal passenger seat system may be coupled to the seat support structure (e.g., beneath the lower body support member).

In a further aspect, embodiments of the inventive concepts disclosed herein are directed to a UPSS that can be installed in/on any passenger support structure (e.g., a passenger seat, hospital gurney, etc.). In such embodiments, the UPSS can include an enclosure configured to be coupled to the passenger support structure. A system controller can be disposed within the enclosure. The system controller can be in communication with at least one biometric sensor, physiological sensor, and/or situational data sensor. An artificial intelligence engine can be communicatively coupled to or embedded within the system controller. The artificial intelligence engine is configured to determine a passenger status based on data received from the biometric sensor, the physiological sensor, and/or the situational data sensor and is further configured to generate one or more communication signals based on the data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 is a block diagram illustrating the universal passenger seat system in accordance with example embodiments of this disclosure;

DETAILED DESCRIPTION

Figure 1:
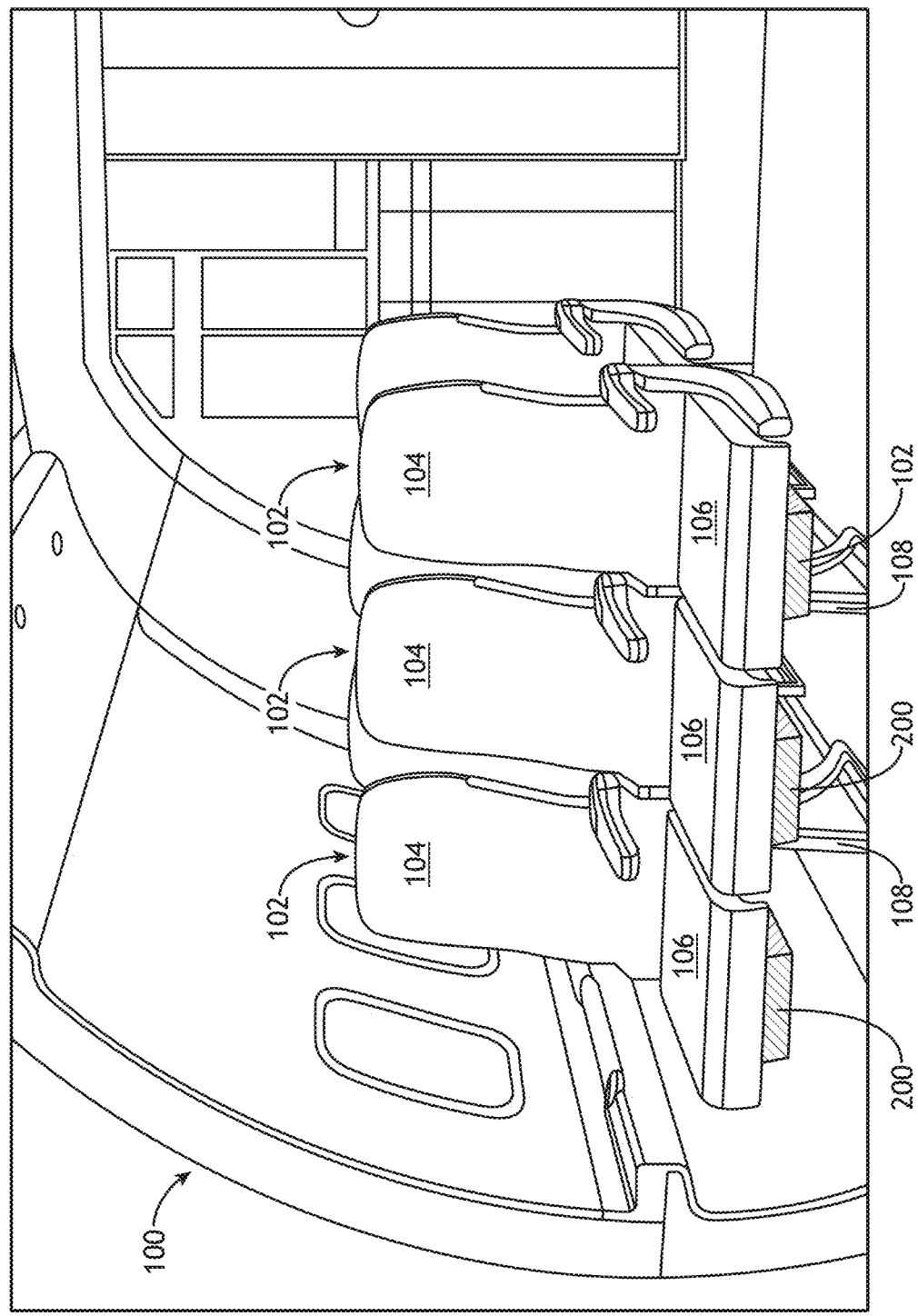
FIG. 1 is an illustration of an aircraft environment in which a universal passenger seat system can be implemented in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a universal passenger seat system (UPSS) and data interface. This disclosure centers on the realization that instead of allowing differing systems with little interconnection to develop for autonomous vehicles (e.g., self-driving cars, busses, semi-trucks, trains, boats, airplanes, etc.) and/or mass transit vehicles (e.g., busses, trains, airplanes, boats, etc.), a standardized interface that handles the foreseen needs of passenger seating for autonomous and/or mass transit vehicles is needed. The UPSS and data interface described herein can work to reduce the presence of concurrent technologies that achieve similar outcomes in passenger seating for autonomous and/or mass transit vehicles. The UPSS can also provide improvements in response to major incidents (e.g., crashes, explosions, water landings, system failures, etc.) involving society and autonomous and/or mass transit vehicles. For example, data collected and reported by the UPSS can affect the arrival of ambulances, the assistance given to the disabled, crash victims and any number of incidents in which autonomous and/or mass transit vehicles have been involved in an incident.

FIG. 1 illustrates an example embodiment of an aircraft 100 that includes a plurality of passenger seats 102. Each passenger seat 102 includes or is coupled to a UPSS 200. In embodiments, a passenger seat 102 has an upper body support member 104 (e.g., a seat back) and a lower body support member 106 (e.g., a seat or base). The passenger seat 102 also includes a seat support structure 108 (e.g., a seat chassis and/or seating hardware) that is coupled to and configured to provide structural support for the lower body support member 106 and/or the upper body support member 104. The UPSS 200 can be coupled to the seat support structure 108. For example, in some embodiments, the UPSS 200 is disposed beneath the lower body support member 106. In other embodiments, the UPSS 200 may be behind the upper body support member 104 or coupled to another portion of the seat support structure 108.

In some embodiments, the upper body support member 104 and the lower body support member 106 may be separate structures disposed adjacent to one another. Alternatively, the upper body support member 104 and the lower body support member 106 can have one or more shared components. For example, the upper body support member 104 and the lower body support member 106 can have a shared cushion or covering. The upper body support member 104 may be configured to move relative to the lower body support member 106. For example, the upper body support member 104 can be configured to transition between upright and reclining positions. In some embodiments, the lower body support member 106 can also be actuated. For example, the lower body support member 106 may be configured to move forward and backward. The lower body support member 106 and the upper body support member 104 may be simultaneously actuated to transition from a sitting to a laying position. For example, the lower body support member 106 may actuate forwards while the upper body support member 104 reclines to place the passenger seat 102 in a bed-like configuration.

Figure 4:
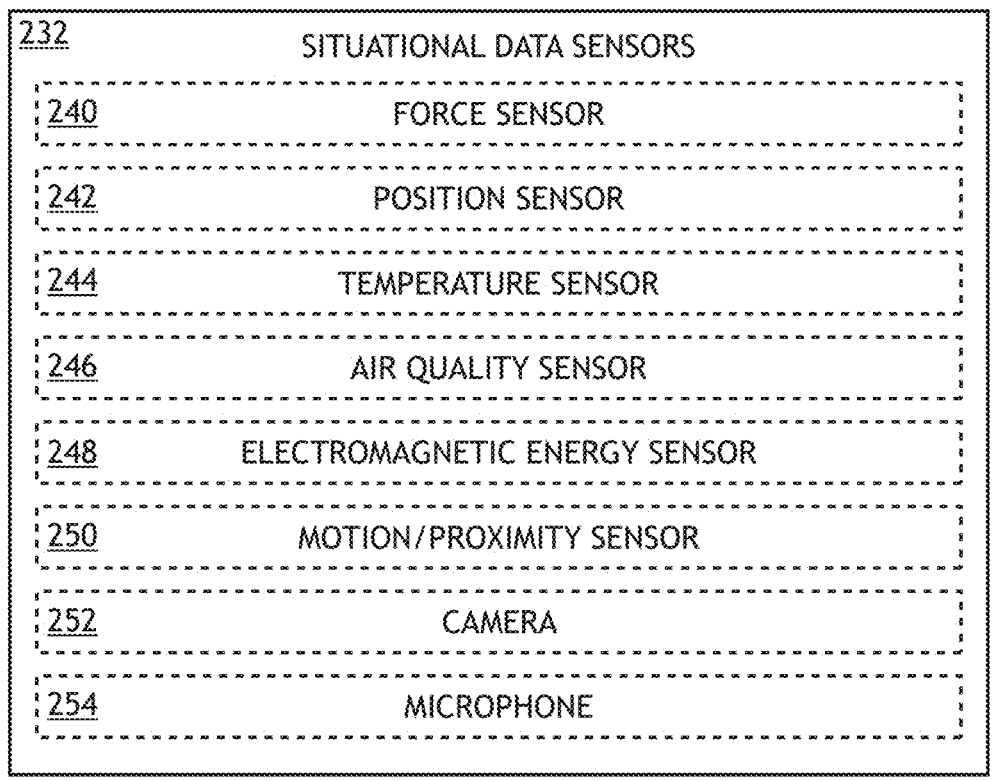
FIG. 4 is a block diagram illustrating situational data sensors of the universal passenger seat system in accordance with example embodiments of this disclosure.

Referring now to FIG. 2, the UPSS 200 can include a system controller 202 that includes or is in communication with various components of the UPSS 200. The system controller 202 may include or may be in communication with one or more of the following: built-in test equipment 204, a dynamic (virtual) router 206, communication protocols 208 (e.g., a standardized UPSS communication protocol and possibly other communication protocols (e.g., USB, Ethernet, CAN bus, SAE, J1939, IEEE 802++, Bluetooth, and so forth) for compatibility across a broad range of devices), a data stream processing system 210, a location determining component 212 (e.g., GNSS receiver, in-vehicle localizer, etc.), a global aeronautical distress and safety system (GADSS) 214, an artificial intelligence engine 216, actuation control hardware 218 (e.g., control circuitry for interfacing with seating hardware), a physical connection interface 220 (e.g., employing the standardized UPSS communication protocol and/or other communication protocols (e.g., USB connector, Ethernet connector, etc.)), a neural network processor (NNP) 222 or cloud tensor processing unit (TPU) 224, a biometric sensor 226 (e.g., voice recognition module, facial recognition module, fingerprint scanner, iris scanner, etc.), a physiological sensor 228 (e.g., a heart rate sensor, blood pressure monitor, plethysmograph, motion sensor, body thermometer, etc.), a human machine interface (e.g., display, speaker, keyboard, mouse, joystick, trackball, trackpad, touch pad, touch panel (display), microphone (e.g., for voice commands), etc.), and/or situational data sensors 232 (e.g., see FIG. 4; a situational data sensor 232 can include a force sensor 240, position sensor 242, temperature sensor 244, air quality sensor 246 (e.g., smoke detector and/or gas sensor), electromagnetic energy sensor 248, motion/proximity sensor 250, camera 252, microphone 254, etc.).

In some embodiments, one or more of the components are embedded within the system controller 202. For example, the system controller 202 can include circuitry and/or logic for the artificial intelligence engine 216 and other processing systems/units/components of the UPSS 200. Other components can be communicatively coupled to the system controller 202. For example, some UPSS 200 components can be connective via data cables, on-chip electrical connections, or via wired or wireless connections (e.g., via the physical connection interface 220).

Figure 3:
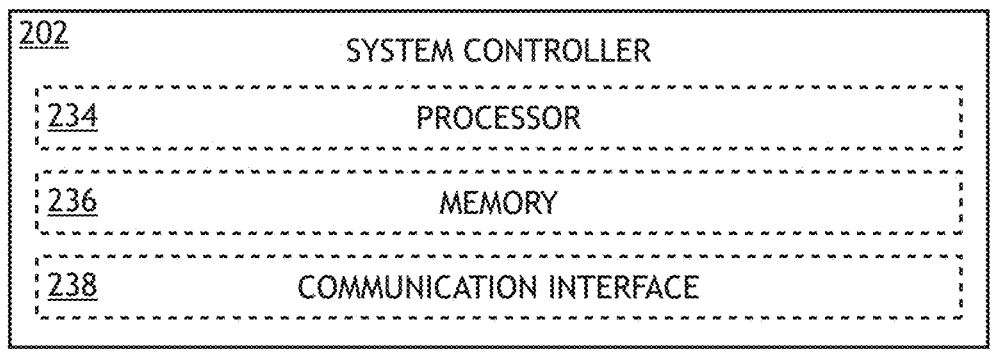
FIG. 3 is a block diagram illustrating a system controller of the universal passenger seat system in accordance with example embodiments of this disclosure.

In an embodiment shown in FIG. 3, the system controller 202 includes at least one processor 234, at least one memory 236, and at least one communication interface 238. The processor 234 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 234 can execute one or more software programs embodied in a non-transitory computer readable medium (e.g., memory 236) that implement techniques described herein. The processor 234 is not limited by the materials from which it is formed or the processing mechanisms employed therein and, as such, can be implemented via semiconductor(s) and/or transistors (e.g., using electronic integrated circuit (IC) components), and so forth.

The memory 236 can be an example of tangible, computer-readable storage medium that provides storage functionality to store various data and or program code associated with operation of the controller 202, such as software programs and/or code segments, or other data to instruct the processor 234, and possibly other components of the UPSS 200/controller 202, to perform the functionality described herein. Thus, the memory 236 can store data, such as a program of instructions for operating the UPSS 200 (including its components), and so forth. It should be noted that while a single memory 236 is described, a wide variety of types and combinations of memory (e.g., tangible, non-transitory memory) can be employed. The memory 236 can be integral with the processor 234, can comprise stand-alone memory, or can be a combination of both. Some examples of the memory 236 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth. In implementations, the UPSS 200 and/or the memory 236 can include removable integrated circuit card (ICC) memory, such as memory provided by a subscriber identity module (SIM) card, a universal subscriber identity module (USIM) card, a universal integrated circuit card (UICC), and so on.

The communication interface 238 can be operatively configured to communicate with components of the UPSS 200. For example, the communication interface 238 can be configured to retrieve image data from the camera 202, transmit data for storage in the memory 236, retrieve data from storage in the memory 236, and so forth. The communication interface 238 can also be communicatively coupled with the processor 234 to facilitate data transfer between components of the UPSS 200 and the processor 234 (e.g., for communicating inputs to the processor 234 received from a device (e.g., sensor 226/228/232, human machine interface 230, mobile device, location determining component 212, etc.) communicatively coupled with the UPSS 200/controller 202). It should be noted that while the communication interface 238 is described as a component of controller 202, one or more components of the communication interface 238 can be implemented as external components communicatively coupled to the UPSS 200 via a wired and/or wireless connection. The UPSS 200 can also include and/or connect to one or more input/output (I/O) devices (e.g., via the communication interface 238), such as a display, a mouse, a touchpad, a touchscreen, a keyboard, a microphone (e.g., for voice commands) and so on. For example, the communication interface 238 can include or can be coupled to a transceiver (e.g., wireless transceiver), physical connection interface 220, one or more communication protocols 208, and so forth.

Figure 5:
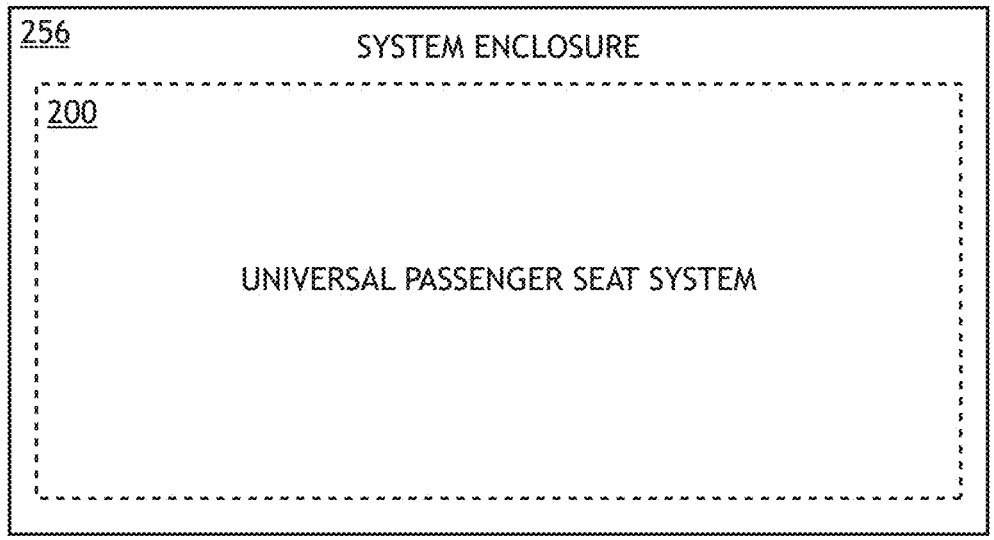
FIG. 5 is a block diagram illustrating the universal passenger seat system in accordance with example embodiments of this disclosure, where the universal passenger seat system is at least partially contained within a system enclosure.
Figure 6A:
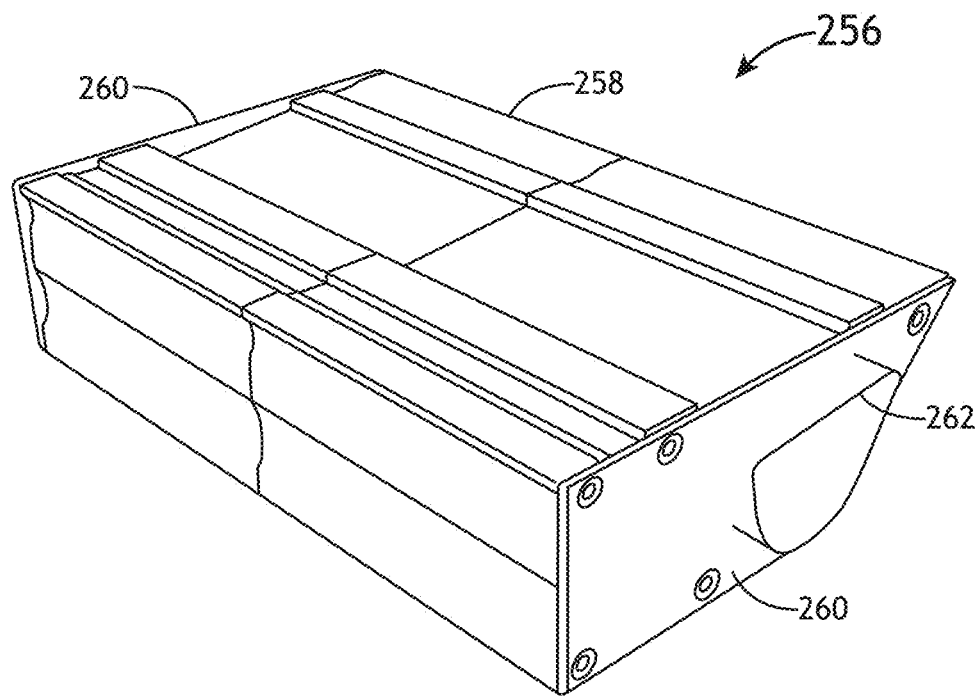
FIGS. 6A and 6B are a perspective view and an exploded perspective view of the system enclosure, respectively, in accordance with example embodiments of this disclosure.
Figure 6B:
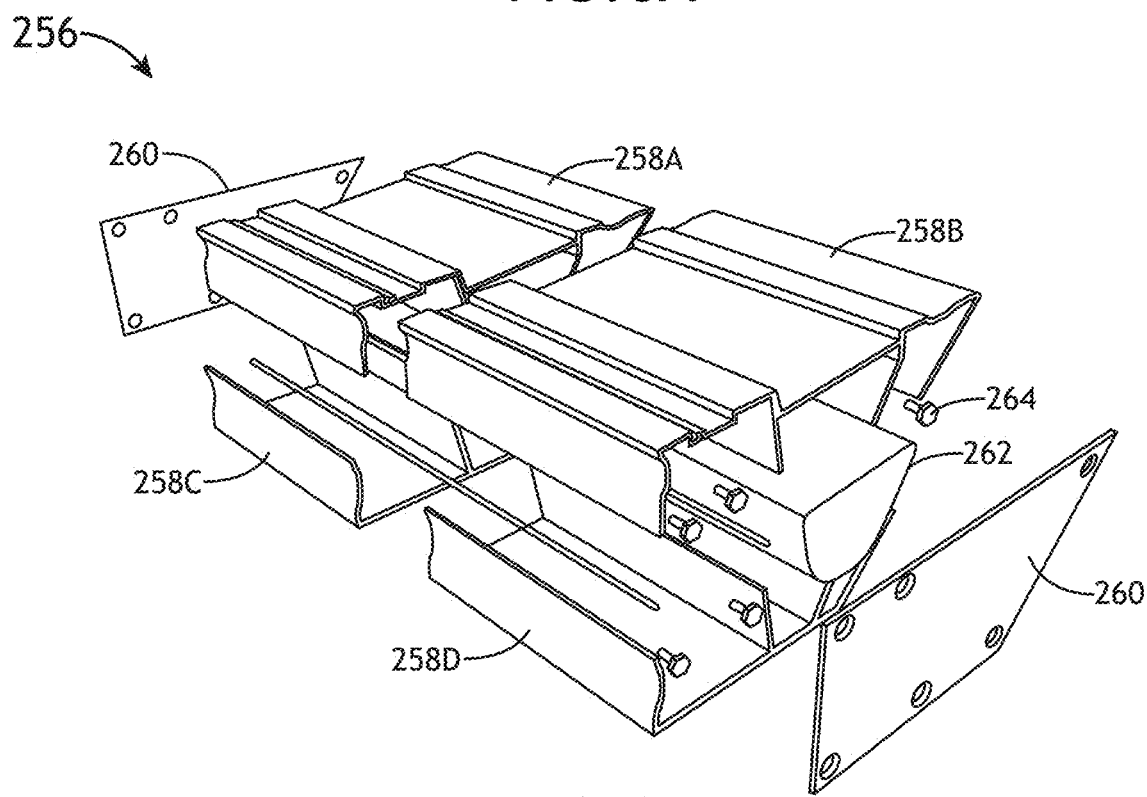

As shown in FIG. 5, the UPSS 200 includes a system enclosure 256 configured to contain at least a portion of the UPSS components. An example embodiment of the system enclosure is shown in FIGS. 6A and 6B. The system enclosure 256 may include a body 258 that defines a cavity configured to contain some or all of the UPSS 200 components. As shown in FIG. 6B, in some embodiments, the body 258 is made up of two or more body segments (e.g., upper body segments 258A, 258B and lower body segments 258C, 258D) that fit together to make the body 258. The system enclosure 256 can also include endplates 260 located on either side of the body 258 and a support beam 262 extending through the body 258 from one endplate 260 to the other. The endplates 260 may be attached to the body 258 with a plurality of fasteners 264 (e.g., screws, bolts, or the like). In some embodiments, the support beam 262 extends past the endplates 260 so that the support beam 262 can be coupled to a seat support structure 108. For example, the support beam 262 may extend through respective apertures formed in the endplates 260. The support beam 262 can provide a structural backbone for the system enclosure 256 so that the system enclosure 256 its contents can be suspended from the seat support structure 108.

Figure 7C:
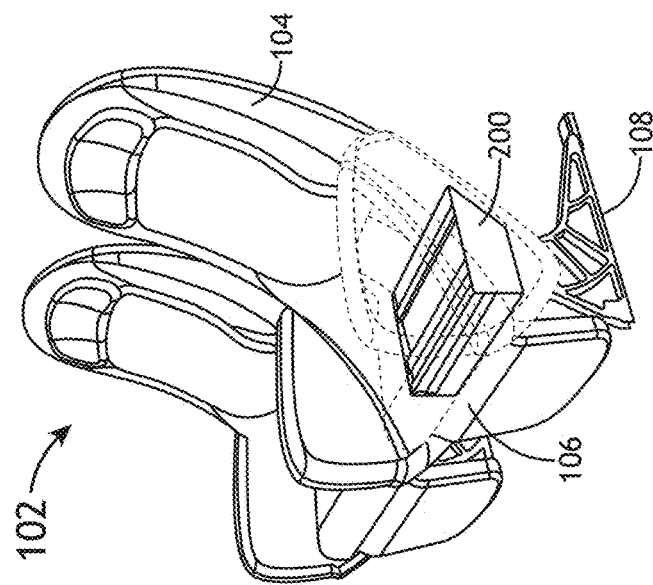
FIGS. 7A through 7C are illustrations of passenger seats that can include or be coupled to a universal passenger seat system in accordance with example embodiments of this disclosure.
Figure 7B:
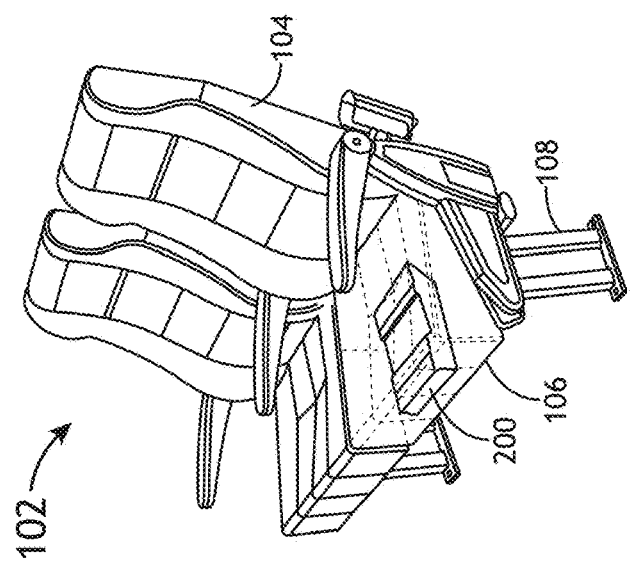
Figure 7A:
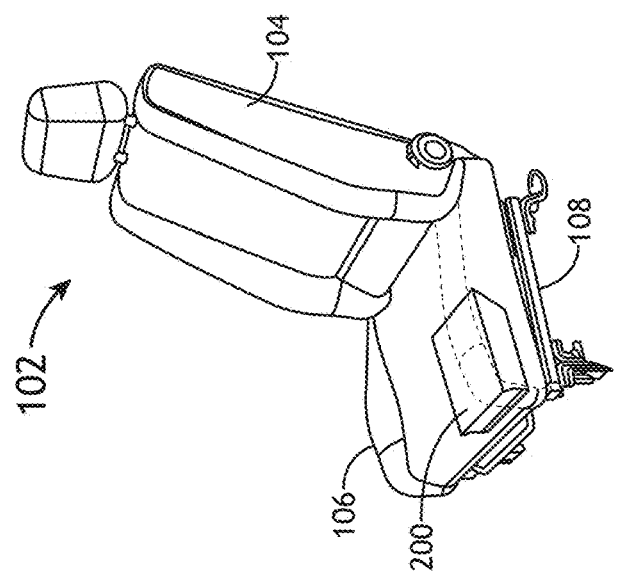

The form-factor of the system enclosure 256 shown in FIGS. 6A and 6B is one example; however, the system enclosure 256 can be smaller, larger, and/or shaped differently for different implementations. For example, FIG. 7A through 7C show various passenger seats 102 that can coupled with respective UPSSs 200, where the UPSS 200 has a small, medium, or large form-factor depending on the type of passenger seat 102 in/on which it is installed. FIG. 7A shows an example embodiment where the passenger seat 102 is a passenger seat for a standard road vehicle (e.g., car, truck, van, SUV, etc.) and the UPSS 200 is implemented within a small system enclosure 256. FIG. 7B shows an example embodiment where the passenger seat 102 is a passenger seat for a mass transit vehicle (e.g., aircraft, train, boat, bus, etc.) and the UPSS 200 is implemented within a medium sized system enclosure 256. FIG. 7C shows an example embodiment where the passenger seat 102 is a larger (e.g., private, business or first-class) passenger seat for a mass transit vehicle (e.g., aircraft, train, boat, bus, etc.) or a spacecraft, or supersonic travel passenger seat, and the UPSS 200 is implemented within a large system enclosure 256.

Figure 8:
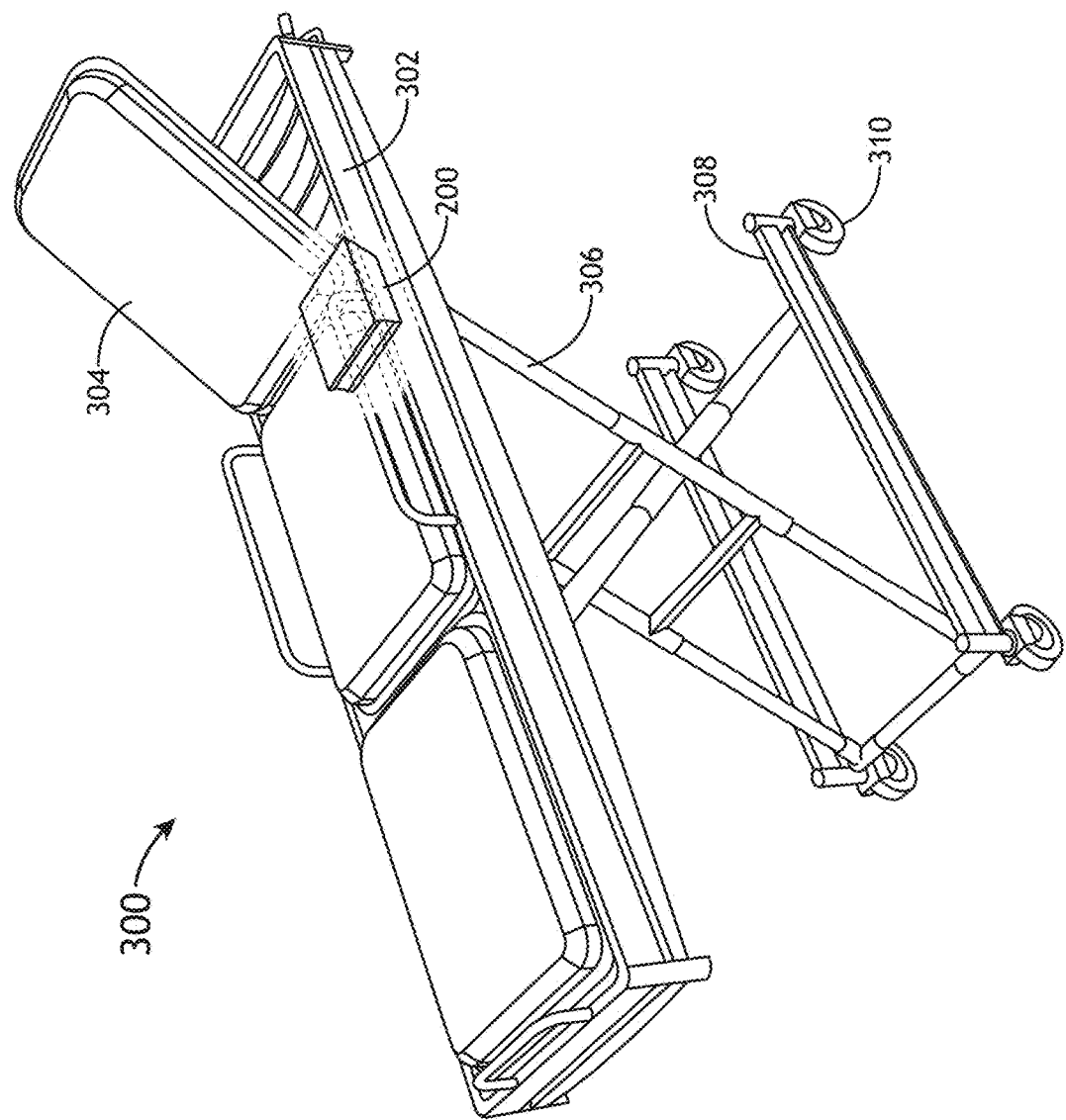
FIG. 8 is an illustration of a hospital gurney that can include or be coupled to a universal passenger seat system in accordance with example embodiments of this disclosure.

Further, the UPSS 200 may be installed in/on other types of passenger support structures (e.g., other than passenger seats). For example, FIG. 8 shows an embodiment of a hospital gurney 300 that includes or is coupled to a UPSS 200. The hospital gurney 300 may include a frame 302 and a bed 304 that a passenger (e.g., a patient) can be seated or laid down upon. The frame 302 may ride on a base 308 with wheels 310 and adjustable/collapsible supports 306 that hold the frame 302. The UPSS 200 may be coupled to the frame 302 and configured to monitor passenger vitals and situational data (e.g., motion, sound, location, etc.) while the passenger is transported from one place to another (e.g., from an operating room to an intensive care unit, or the like).

Figure 9:
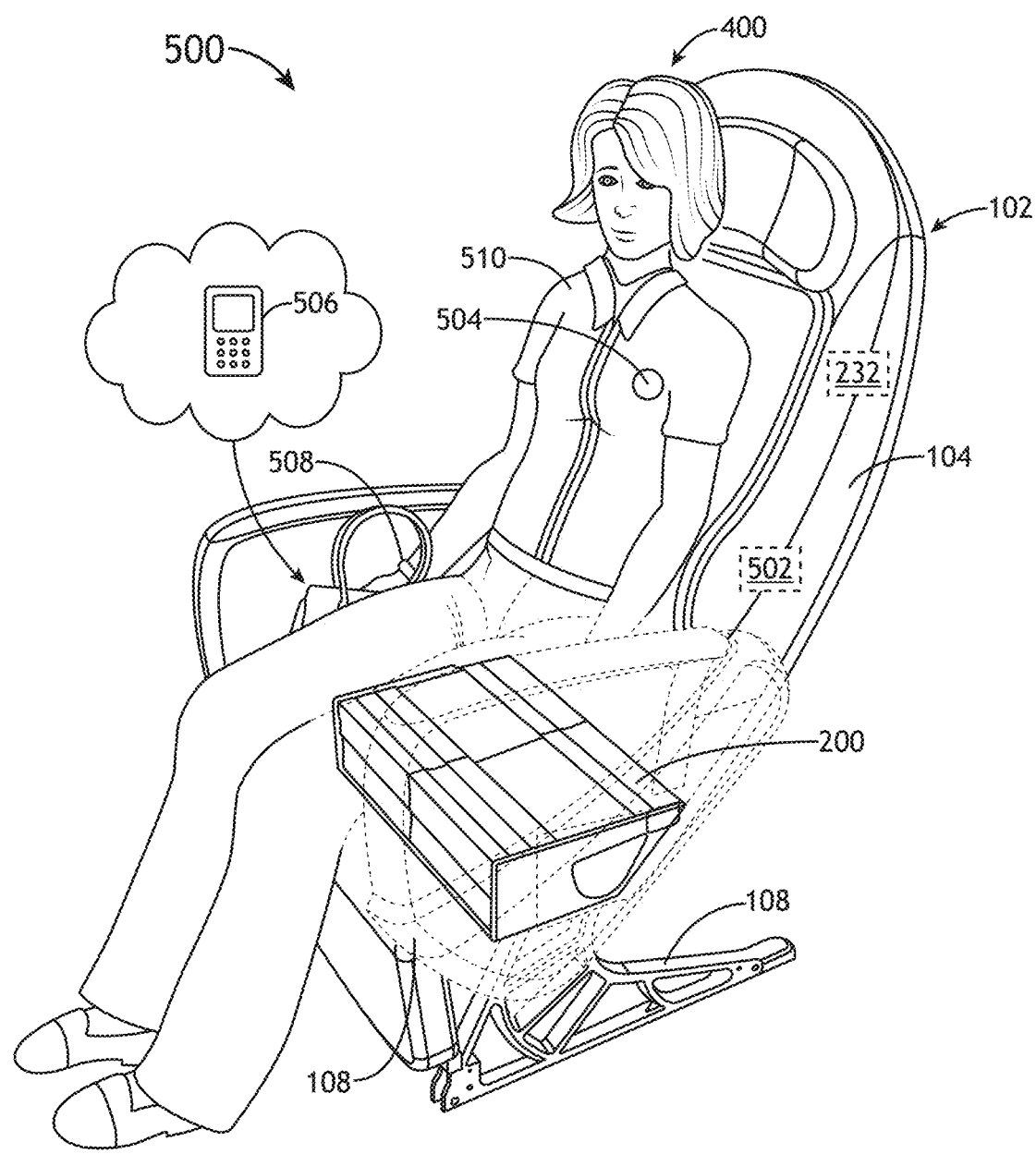
FIG. 9 is an illustration of a passenger environment including a passenger seat with a universal passenger seat system included within or coupled to the passenger seat in accordance with example embodiments of this disclosure.

The UPSS 200 may include or may be coupled with several sensors and/or peripheral devices that enable the UPSS 200 to monitor and control the passenger experience. FIG. 9 illustrates a passenger environment 500 where a passenger 400 is seated on a passenger seat 102 that is includes or is coupled to a UPSS 200. The UPSS 200 can be communicatively coupled to one or more components in/on the passenger seat 102. For example, the UPSS 200 may be communicatively coupled (e.g., via the physical connection interface 220) to seating hardware 502 (e.g., see FIG. 11; seating hardware 502 can include one or more seat actuators 510, a temperature controller 512, or the like) and/or one or more situational data sensors 232 that are embedded within or attached to the passenger seat 102 and/or its surrounding area. The UPSS 200 can also be in communication with one or more media or health peripheral devices 604, such as, but not limited to, a human machine interface 230 (e.g., display and/or any other user interface device), a health monitoring device 504, a mobile device 506 (e.g., smartphone, tablet, notebook computer, etc.), a wearable device 508 (e.g., smart watch, activity tracker, headphones, etc.), combinations thereof, and so forth.

The physical connection interface 220 can include wired and/or wireless connectors for connecting to the various components. For example, the physical connection interface 220 may include a standardized physical connector and/or a standardized communication protocol (e.g., UPSS communication protocol) for connecting to seating hardware 502, situational data sensors 232, a human machine interface 230, and/or any other components that are built into or coupled to the passenger seat 102 and/or its surrounding area. The physical connection interface 220 may also include other physical connectors and/or communication protocols (e.g., USB, Ethernet, Lightning, HDMI, etc.). In some embodiments, the physical connection interface 220 includes at least one wireless (e.g., Bluetooth, near-field communication (NFC), WLAN) transceiver for connecting to the various components. For example, the UPSS 200 may be wirelessly connected to the situational data sensors 232 or paired health monitoring devices 504 (e.g., biometric sensor 226, physiological sensor 228, or the like), mobile devices 506, wearable devices 508, and the like.

Figure 10:
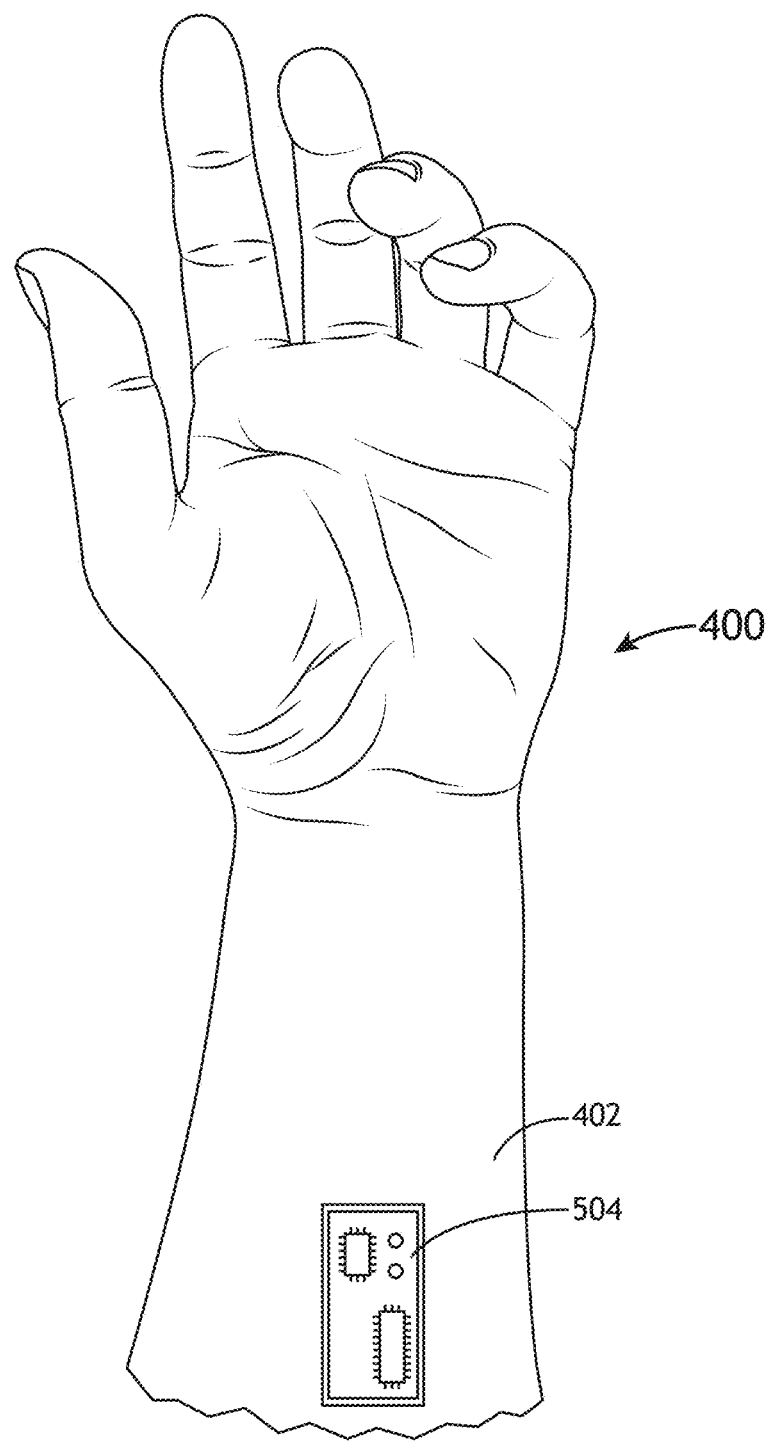
FIG. 10 is an illustration of a passenger body portion with a biometric and/or physiological sensor coupled to or embedded within the passenger body portion in accordance with example embodiments of this disclosure, where the biometric and/or physiological sensor is configured to communicate with the universal passenger seat system.

In some embodiments (e.g., as shown in FIG. 10), a health monitoring device 504 (e.g., biometric sensor 226 and/or physiological sensor 228) is directly coupled to or at least partially embedded within a body portion 402 of the passenger 400. For example, the health monitoring device 504 may be adhered or fastened (e.g., with one or more microneedles, sutures, straps, tape, etc.) to a skin surface of the body portion 402. In another example embodiment, the health monitoring device 504 can be embedded at least partially embedded within the body portion 402 (e.g., at least partially disposed subcutaneously).

The passenger environment 500 can be part of a larger network of multiple passenger environments 500. For Example, each passenger seat 102 can be associated with a respective passenger environment 500. Some components (e.g., situational data sensors 232) may be shared among two or more passenger environments 500.

Figure 11:
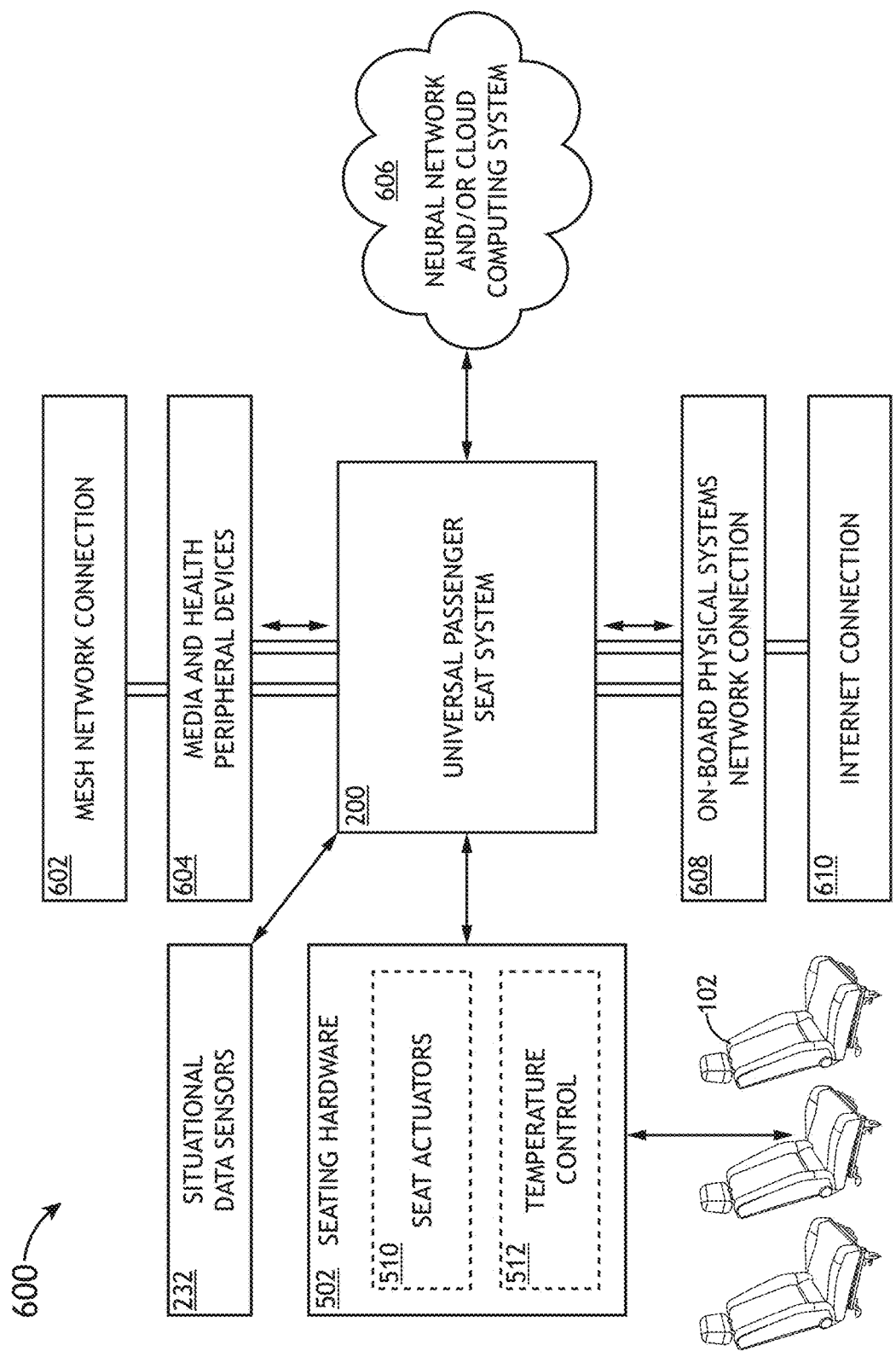
FIG. 11 is a block diagram illustrating a network environment that includes the universal passenger seat system, seating hardware, peripheral devices, and network connections in accordance with example embodiments of this disclosure.

FIG. 11 shows an example embodiment of a network environment 600 that includes the UPSS 200 in communication with seating hardware 502 (e.g., seat actuator 510, temperature controller 512, etc.), situational data sensors 232, media and health peripheral devices 604 (e.g., human machine interface 230 (e.g., display, speakers, and/or any other user interface device), health monitoring device 504, mobile device 506 (e.g., smartphone, tablet, notebook computer, etc.), wearable device 508 (e.g., smart watch, activity tracker, headphones, etc.), or any combination thereof) and/or one or more network connections. Examples of network connections can include, but are not limited to, a mesh network connection 602 (e.g., via connection with seating hardware 502, situational data sensors 232, media and health peripheral devices 604, and/or other network-enabled devices (e.g., other UPSSs 200)), a connection to a neural network and/or cloud computing system 606, an on-board physical systems network connection 608 (e.g., to communicate with vehicle lighting systems, alarm/alert systems, crew communication systems, vending systems, etc.), an internet connection 610, or any combination thereof.

Figure 12:
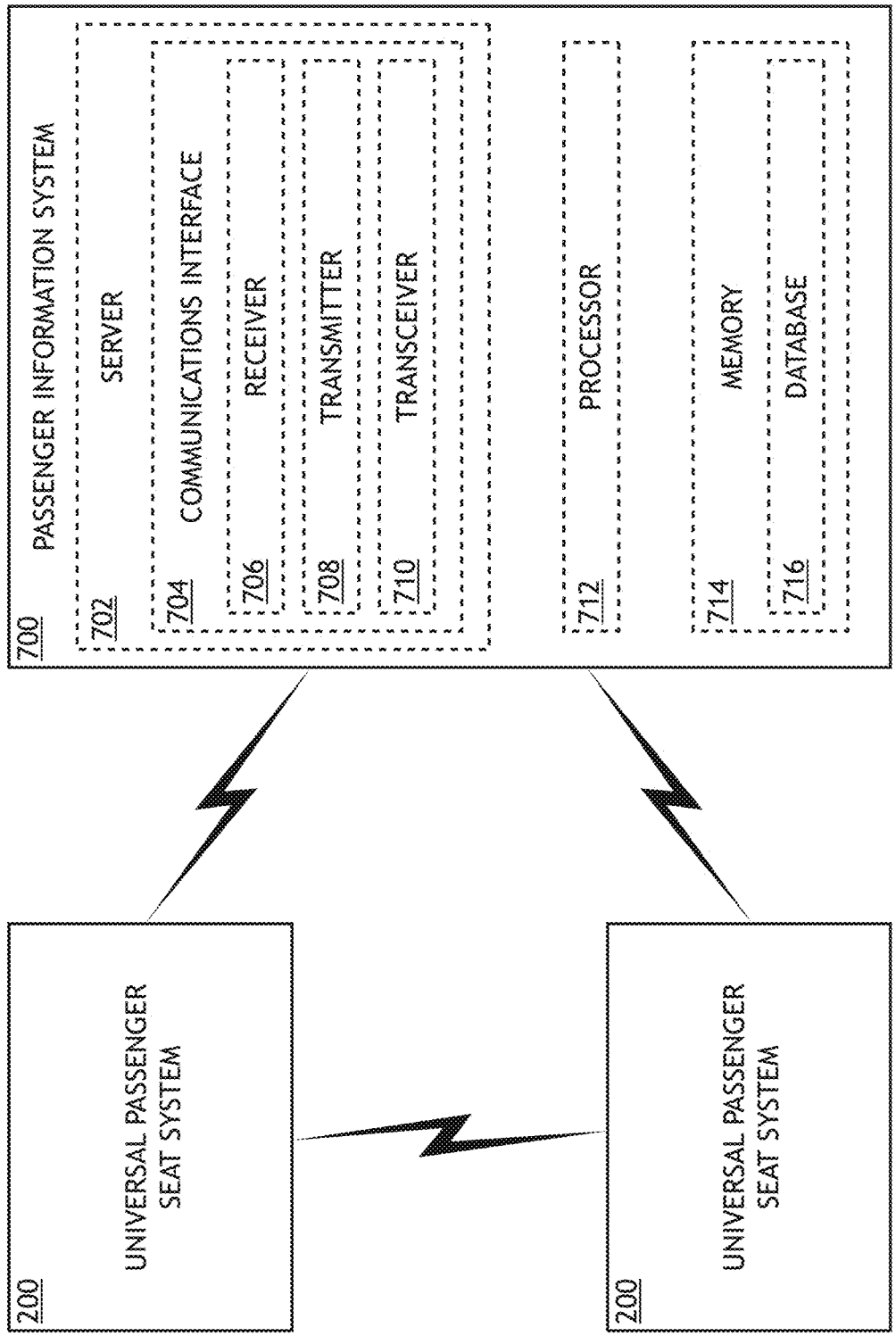
FIG. 12 is a block diagram illustrating connectivity of the universal passenger seat system with a passenger information system and/or with another universal passenger seat systems in accordance with example embodiments of this disclosure.

Referring to FIG. 12, in embodiments, the one or more network connections facilitate communications between the UPSS 200 and another UPSS 200. The one or more network connections can also facilitate communication between the UPSS 200 and a passenger information system 700. The passenger information system 700 may be configured to collect information from and distribute information to a plurality of UPSSs 200. In some embodiments, the passenger information system 700 facilitates communications between the UPSS 200 and another UPSS 200. For example, the passenger information system 700 can be configured to receive a communication from a first UPSS 200 and relay the communication to a second UPSS 200.

The passenger information system 700 may be an on-board (e.g., in-vehicle system) or a remote (e.g., server or cloud-based) system that is configured to communicate with the UPSS 200 via the internet connection 610. In some embodiments, the passenger information system 700 can include on-board and remote components. For example, the passenger information system 700 can be a distributed system with an on-board component that collects data from the UPSSs 200 and a remote component that periodically receives and stores a copy of the collected data or a portion of the collected data (e.g., critical data items). In embodiments, the passenger information system 700 may include at least one server 702 (e.g., a computing device or network of computing devices) having a communications interface 704 (e.g., a receiver 706, transmitter 708, transceiver 710, or any combination thereof) and at least one processor 712 (or controller) in communication with a memory 714. The memory 714 can include a database 716 configured to store information received by the passenger information system 700, for example, passenger status updates, sensor data (e.g., health, activity, and/or situational data), passenger inputs/requests received via peripheral devices 604, and so forth.

Referring generally to FIGS. 1 through 12, the UPSS 200 can be configured to monitor and interact with the passenger 400 and/or the passenger environment 500. For example, the UPSS 200 can continuously or periodically collect data from the one or more biometric sensors 226, physiological sensors 228, and/or situational data sensors 232. The artificial intelligence engine 216 (or system controller 202) is configured to determine a passenger status based one the sensor data. The artificial intelligence engine 216 (or system controller 202) is further configured to generate one or more communication signals based on the sensor data. For example, the artificial intelligence engine 216 (or system controller 202) can be configured to generate one or more communication signals including at least one control signal for the seating hardware 502, at least one information signal for a peripheral device 604, or at least one status signal for transmission via a network connection (e.g., to the passenger information system 700).

In an example embodiment, the artificial intelligence engine 216 (or system controller 202) is configured to determine the passenger status at least partially based on a passenger identity detected by the biometric sensor 226. For example, the biometric sensor 226 can be configured to detect and identification feature (e.g., fingerprint scan, facial scan, iris scan, voice recording) associated with the passenger 400, and the artificial intelligence engine 216 (or system controller 202) can be configured to compare the detected identification feature with one or more stored passenger identities to determine if the identification feature matches one of the stored passenger identities. The passenger status can include a validation message (e.g., "correct passenger") when the detected identification feature matches with a passenger identity having authorization to occupy the passenger seat 102 or an unauthorized passenger alert (e.g., "unauthorized/incorrect passenger") when the detected identification feature matches with a passenger identity that is not authorized to occupy the passenger seat 102. In some embodiments, the passenger status can also include an unauthorized passenger alert (e.g., "unauthorized/incorrect passenger") when the detected identification feature does not match with any of the stored passenger identities. In other embodiments, the passenger status can include an error alert (e.g., "cannot determine passenger identity") when the detected identification feature does not match with any of the stored passenger identities.

The artificial intelligence engine 216 (or system controller 202) may be configured to access a passenger profile (e.g., via the passenger information system 700, stored profiles in the UPSS 200, or based on user entries, pairing with a passenger mobile device 506, social media account, health records, etc.). The passenger profile may include passenger preferences (e.g., seating preferences, lighting preferences, media preferences (e.g., favorite music/shows, etc.), meal preferences, and the like), health conditions (e.g., diabetes, high/low blood pressure, etc.), age, height, weight, gender, and so forth. The artificial intelligence engine 216 (or system controller 202) can be configured to determine the passenger status at least partially based on the passenger profile. For example, the artificial intelligence engine 216 (or system controller 202) can be configured to determine that the passenger 400 suffers from acid reflux based on the passenger profile and can be configured to generate control signals for the seating hardware 502 to place the passenger seat 102 at a slight angle when the passenger seat 102 is in "bed mode." In another example, if the passenger profile indicates that the passenger 400 has a high risk of developing blood clots, the artificial intelligence engine 216 (or system controller 202) can be configured to generate an information signal (e.g., for a media or health peripheral device 604) to warn the passenger 400 to get up and walk around periodically.

The artificial intelligence engine 216 (or system controller 202) may be configured to determine the passenger status at least partially based on a passenger vital status detected by the physiological sensor 228. For example, the artificial intelligence engine 216 (or system controller 202) may be configured to receive a pulse or heart rate measurement from the physiological sensor 228. In the case of a major incident, the artificial intelligence engine 216 (or system controller 202) can be configured to send status signals (e.g., report passenger vital statuses) to the passenger information system 700 and/or directly to emergency or rescue entity systems. Where mass casualties may occur, the vital statuses can be used to prioritize search and rescue missions. For example, passengers with non-life threatening or unrecoverable (e.g., minutes to live) injuries may be assigned lower priority than passengers with critical but recoverable (e.g., life-threatening if left untreated) injuries. In another example, the passenger vital status (e.g., pulse or heart rate) may indicate that the passenger is sleeping, and in response, the artificial intelligence engine 216 (or system controller 202) can be configured to generate one or more control signals for the seating hardware 502 to automatically recline the passenger seat 102. In some embodiments, the UPSS 200 includes actuation control hardware 218 coupled to or embedded within the system controller 202, where the actuation control hardware 218 is configured to generate the control signals for the seating hardware 502 (e.g., on command from the artificial intelligence engine 216 (or system controller 202).

The situational data sensors 232 can provide information about the passenger 400 and/or the passenger environment 500. For example, the artificial intelligence engine 216 (or system controller 202) may be configured to determine the passenger status based on detected environmental factors (e.g., smoke, excessive heat, toxic gases, shock, noise, etc.)

that can affect the passenger 400 and/or are indicative of a threat condition. Based on detected environmental factors, the artificial intelligence engine 216 (or system controller 202) may be configured to generate information signals to warn the passenger 400 (e.g., via a media or health peripheral device 604) and/or generate status signals (e.g., for the passenger information system 700, emergency or rescue services, or the like). In another example, the artificial intelligence engine 216 (or system controller 202) may be configured to determine the passenger status at least partially based on a detected passenger activity level (e.g., detected by a force sensor 240, position sensor 242, motion/proximity sensor 250, camera 252, or any other situational data sensor 232, or a combination thereof). The passenger activity level may be indicative of a passenger's level of distress, vital status, mobility, and so forth. Based on the passenger activity level, the artificial intelligence engine 216 (or system controller 202) may be configured to generate information signals to warn the passenger 400 to be more/less active (e.g., via a media or health peripheral device 604) and/or generate status signals (e.g., for the passenger information system 700, emergency rescue services, or the like).

The UPSS 200 may be configured to receive position/location data from another device (e.g., mobile device 506, passenger information system 700, vehicle navigation system, or the like). In some embodiments, the UPSS 200 itself includes a location determining component 212 (e.g., GNSS receiver, triangulation-based localizer (e.g., Bluetooth or Wi-Fi receiver), or the like). The artificial intelligence engine 216 (or system controller 202) may be configured to determine the passenger status at least partially based on positioning signals detected by the location determining component 212. For example, in some implementations, the passenger status and/or communication signals associated with the passenger status can include position coordinates for the UPSS 200. This may help search and rescue responders locate the passenger seat 102 (and hence, the passenger 400) in the event of a major incident.

As described above, in some embodiments, the UPSS 200 can also include a GADSS 214. For example, the GADSS 214 may include an aircraft-grade black box with data recording components housed therein. In some embodiments, the artificial intelligence engine 216 (or system controller 202) is configured to generate one or more communication signals based on information collected by the GADSS 214 when the sensor data indicates at least a threshold distress level. For example, when the physiological sensor 228 and/or one or more situational data sensors 232 detect vital status or environmental factors that violate predetermined acceptable parameters, the artificial intelligence engine 216 (or system controller 202) may be configured to send GADSS information to the passenger information system 700, emergency or rescue services, or the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A universal passenger seat system, comprising:
    an enclosure configured to be coupled to a seat support structure;
    a system controller disposed within the enclosure;
    a physical connection interface comprising a standardized communication protocol for coupling the system controller with seating hardware, at least one peripheral device, and at least one network connection, the standardized communication protocol including at least one of USB, Ethernet, CAN bus, SAE, J1939, IEEE 802++, or Bluetooth;
    at least one of a biometric sensor, a physiological sensor, or a situational data sensor;
    an artificial intelligence engine communicatively coupled to or embedded within the system controller, the artificial intelligence engine configured to determine a passenger status based on data received from the at least one of the biometric sensor, the physiological sensor, or the situational data sensor and data from a passenger profile, wherein the artificial intelligence engine is configured to generate one or more communication signals based on the data received from the at least one of the biometric sensor, the physiological sensor, or the situational data sensor and the data from the passenger profile, the passenger profile including age and health condition information;
    wherein the one or more communication signals include at least one of a control signal for the seating hardware, an information signal for the at least one peripheral device, or a status signal for transmission via the at least one network connection;
    a global aeronautical distress and safety system communicatively coupled to or embedded within the system controller, wherein the artificial intelligence engine is configured to generate one or more additional communication signals based on information collected by the global aeronautical distress and safety system when the data received from the at least one of the biometric sensor, the physiological sensor, or the situational data sensor indicates at least a threshold distress level, the global aeronautical distress and safety system including an aircraft-grade black box with data recording components; and
    a location determining component communicatively coupled to the system controller, wherein the artificial intelligence engine is configured to determine the passenger status at least partially based on positioning signals detected by the location determining component, the positioning signals including position coordinates of a location of the system controller and associated with a particular passenger seat.

2. The universal passenger seat system of claim 1, wherein the at least one network connection comprises at least one of an internet connection, an on-board network connection, a mesh network connection, a neural network system connection, or a cloud computing system connection.

3. The universal passenger seat system of claim 1, further comprising actuation control hardware coupled to or embedded within the system controller, wherein the actuation control hardware is configured to generate the control signal for the seating hardware.

4. The universal passenger seat system of claim 1, wherein the artificial intelligence engine is configured to determine the passenger status at least partially based on a passenger identity detected by the biometric sensor.

5. The universal passenger seat system of claim 1, wherein the artificial intelligence engine is configured to determine the passenger status at least partially based on a passenger vital status detected by the physiological sensor.

6. The universal passenger seat system of claim 1, wherein the artificial intelligence engine is configured to determine the passenger status at least partially based on a passenger activity level detected by the situational data sensor.

7. A passenger seat, comprising:
a lower body support member disposed upon a seat support structure;
an upper body support member adjacent to the lower body support member;
a seat support structure coupled to at least one of the lower body support member or the upper body support member;
an enclosure coupled to the seat support structure;
a system controller disposed within the enclosure;
a physical connection interface comprising a standardized communication protocol for coupling the system controller with seating hardware, at least one peripheral device, and at least one network connection, the standardized communication protocol including at least one of USB, Ethernet, CAN bus, SAE, J1939, IEEE 802++, or Bluetooth;
at least one of a biometric sensor, a physiological sensor, or a situational data sensor;
an artificial intelligence engine communicatively coupled to or embedded within the system controller, the artificial intelligence engine configured to determine a passenger status based on data received from the at least one of the biometric sensor, the physiological sensor, or the situational data sensor and data from a passenger profile, wherein the artificial intelligence engine is further configured to generate one or more communication signals based on the data received from the at least one of the biometric sensor, the physiological sensor, or the situational data sensor and the data from the passenger profile, the passenger profile including age and health condition information;
wherein the one or more communication signals include at least one of a control signal for the seating hardware, an information signal for the at least one peripheral device, or a status signal for transmission via the at least one network connection;
a global aeronautical distress and safety system communicatively coupled to or embedded within the system controller, wherein the artificial intelligence engine is configured to generate one or more additional communication signals based on information collected by the global aeronautical distress and safety system when the data received from the at least one of the biometric sensor, the physiological sensor, or the situational data sensor indicates at least a threshold distress level, the global aeronautical distress and safety system including an aircraft-grade black box with data recording components; and
a location determining component communicatively coupled to the system controller, wherein the artificial intelligence engine is configured to determine the passenger status at least partially based on positioning signals detected by the location determining component, the positioning signals including position coordinates of a location of the system controller and associated with the passenger seat.

8. The passenger seat of claim 7, wherein the at least one network connection comprises at least one of an internet connection, an on-board network connection, a mesh network connection, a neural network system connection, or a cloud computing system connection.

9. The passenger seat of claim 7, further comprising actuation control hardware coupled to or embedded within the system controller, wherein the actuation control hardware is configured to generate the control signal for the seating hardware.

10. The passenger seat of claim 7, wherein the artificial intelligence engine is configured to determine the passenger status at least partially based on a passenger identity detected by the biometric sensor.

11. The passenger seat of claim 7, wherein the artificial intelligence engine is configured to determine the passenger status at least partially based on a passenger vital status detected by the physiological sensor.

12. The passenger seat of claim 7, wherein the artificial intelligence engine is configured to determine the passenger status at least partially based on a passenger activity level detected by the situational data sensor.

* * * * *